UNITED STATES PATENT OFFICE.

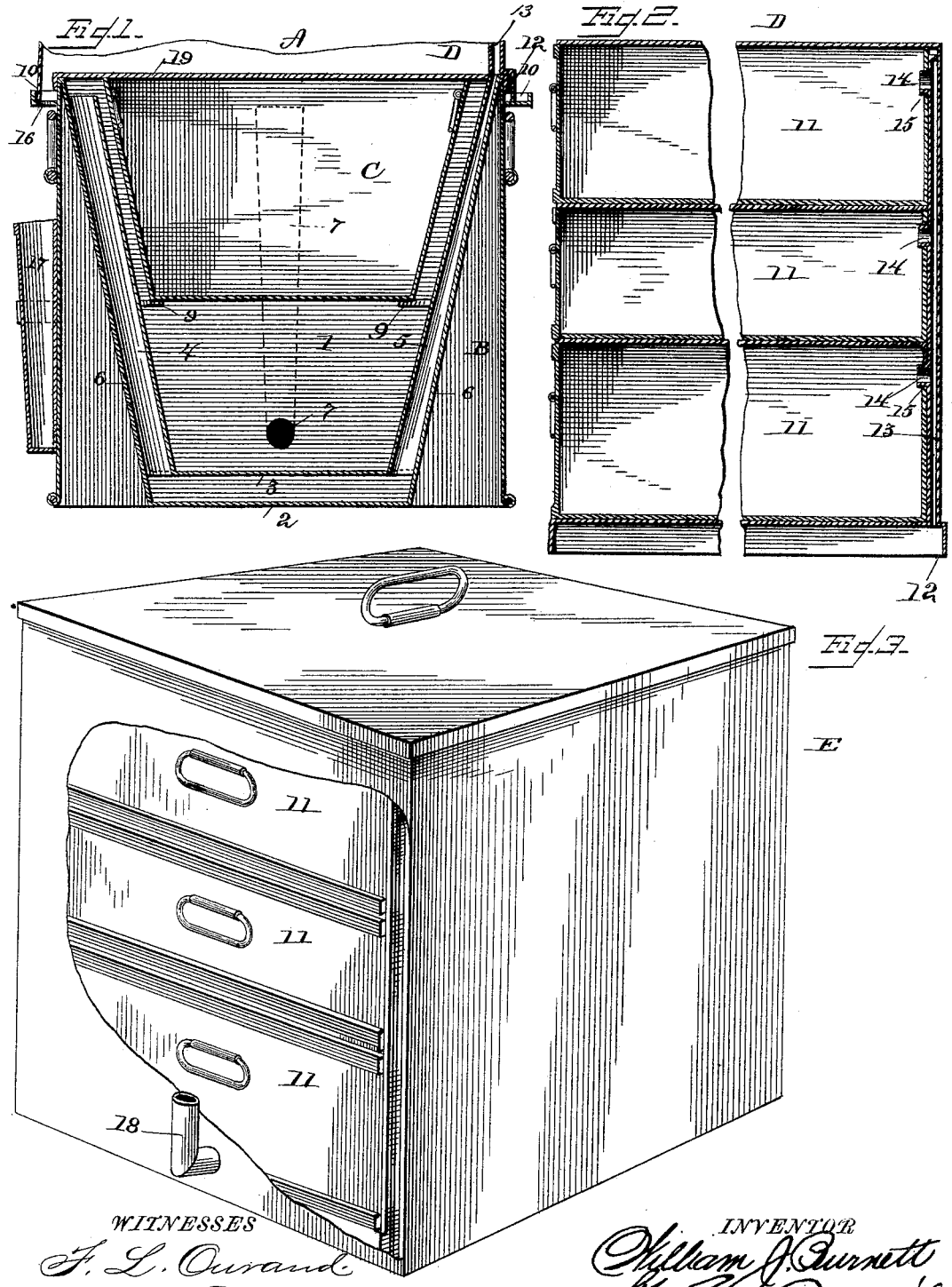

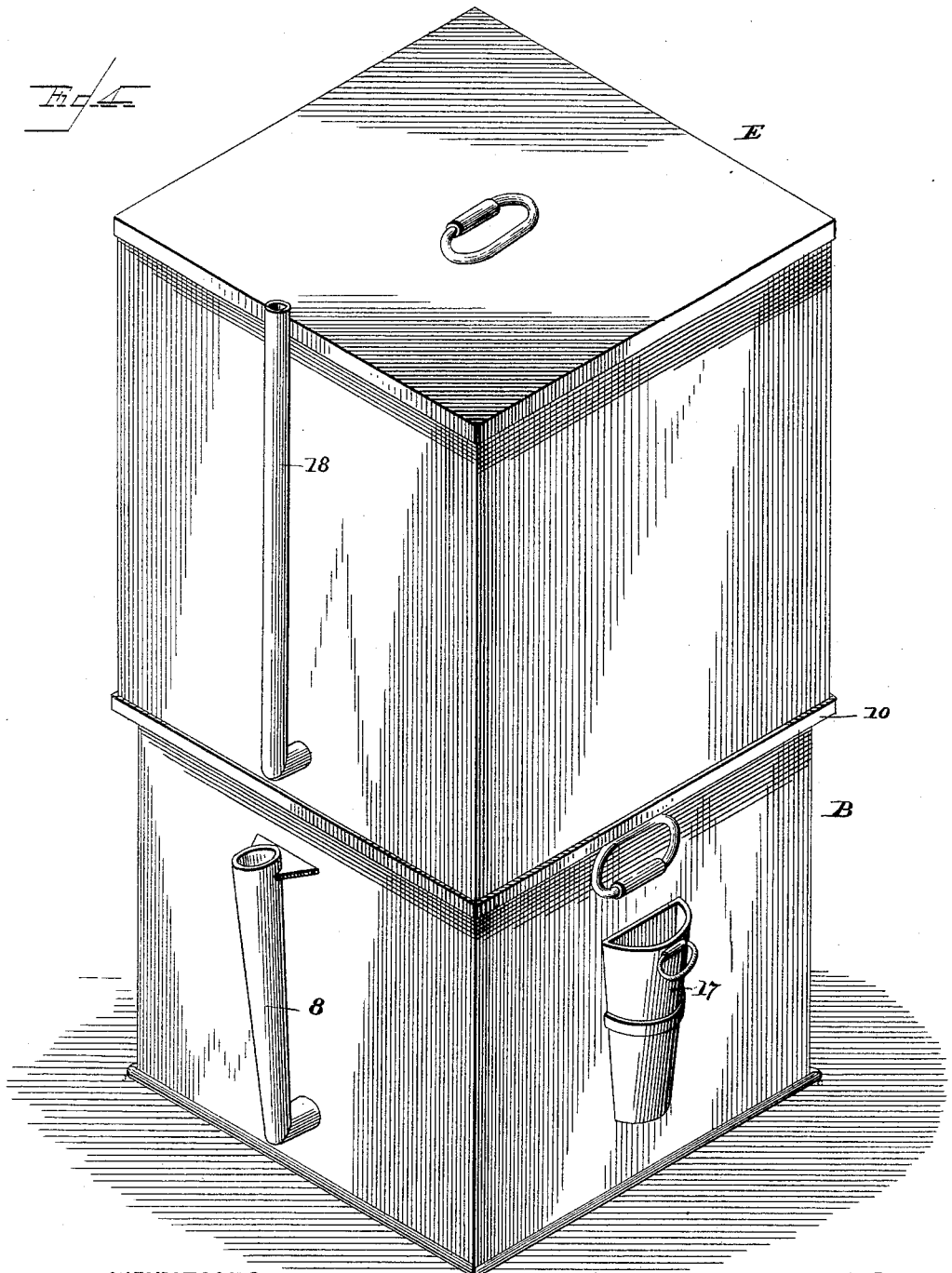

WILLIAM JAMES BURNETT, OF HURON, DAKOTA TERRITORY.

CULINARY UTENSIL.

SPECIFICATION forming part of Letters Patent No. 410,489, dated September 3, 1889.

Application filed August 13, 1888. Serial No. 282,560. (No model.)

*To all whom it may concern:*

Be it known that I, WILLIAM J. BURNETT, a citizen of the United States, and a resident of Huron, in the county of Beadle and Territory of Dakota, have invented certain new and useful Improvements in Culinary Utensils; and I do hereby declare that the following is a full, clear, and exact description of the invention, which will enable others skilled in the art to which it appertains to make and use the same.

This invention relates to culinary utensils.

The object is to produce a utensil for cooking purposes which will use superheated or dry steam instead of wet steam, usually employed; furthermore, to produce a cooking utensil which shall be simple of construction, efficient and durable in use, and comparatively inexpensive of production.

With these objects in view the invention consists in the improved construction and combination of parts of a cooking utensil, as will be hereinafter fully described in the specification, illustrated in the drawings, and pointed out in the claims.

In the accompanying drawings, forming part of this specification, and in which like letters of reference indicate corresponding parts, I have illustrated one form of device embodying the essential features of my invention, although the same may be carried into effect in other ways without departing from the spirit thereof; and in these drawings—

Figure 1 is a longitudinal sectional view of the reservoir for containing the water used in cooking. Fig. 2 is a longitudinal sectional view of the oven. Fig. 3 is a perspective view of the lid or cover to be placed over the said oven, and Fig. 4 is a perspective view of the device intact.

Referring to the drawings, A designates the water-reservoir, consisting of a hopper-shaped receptacle 1, for containing the water, and which is designed to be so placed on the stove or other heating apparatus that the heat will play directly on the bottom portion 2, which may be made of any suitable material, but preferably of copper. Above this bottom, and preferably at a distance of about a half of an inch, is secured a false bottom 3, in which is secured two pipes 4 and 5, the pipe 4 being of the same size its entire length and the pipe 5 being tapered and terminating in a small opening in the top, the object for which these pipes are designed being described further on.

B designates a square casing designed to surround the said hopper-shaped receptacle, so that when the device is placed upon a stove the heat will not only play on the bottom portion 2, but will also be carried around the sides 6 and be confined within the space formed between the casing and the said sides, so that very little, if any, of the heat will be lost, thereby causing the water with which the hopper-shaped receptacle is filled to be heated to the highest point in the shortest possible time.

At a point near the bottom of the receptacle 1 and on one side is attached a pipe 7, one end of which passes through the said receptacle and the other end through the side of the casing B, at which point a joint 8 is secured, which extends to the top of the casing. The object for which this pipe and joint is designed is to enable the operator to fill the receptacle 1 without removing any of the parts, the opening at the top of the pipe being closed in any suitable manner, either by a lid or by means of a plug.

Within the receptacle 1 is placed another receptacle C, which rests upon projections 9 on the sides of the receptacle 1. This latter receptacle is designed to be used for rendering lard, or for any other purpose for which a dry heat—such as superheated steam—is required, but which could not be accomplished with the use of a fire.

Around the upper edge of the casing B is formed a flange 10, in which the oven D rests. This oven is constructed with a number of drawers or compartments 11, in which the articles to be cooked are placed. The rear wall 12 is provided with a flat pipe 13, through which the steam from the pipe 5 passes. In order that each of the compartments or drawers 11 may be supplied with steam, the pipe 13 has secured to it a number of short pipes 14, which, when the drawers are pushed in, engage openings 15 in the rear portion of the drawers. Thus it will be seen that the steam passes to each drawer separately without any waste; but where only one or more of the drawers are used the pipe in the unused drawers may be plugged up, thus preventing any waste of heat. These drawers are designed to fit in the casing D very snugly, so as to prevent the odor of the food contained in one compartment escaping into the compartment either above or below it. In the bottom of the flange 10, in which the oven rests, is an opening 16, through which any wet or condensed steam may escape into a drip-cup 17, secured to the side of the casing.

E designates a cover designed to fit over the oven and thus prevent all heat from escaping from the articles to be cooked. At a point near the bottom and on one side of this cover is secured a pipe 18, which extends up the outside to the top, so as to form an exit for the wet steam and all unpleasant odors from the food.

When the device is to be used, the receptacle 1 is filled with water and then closed by means of a lid or cover 19, which fits over the flange 10. As soon as the water begins to boil the steam is forced through the pipe 4 and down between the copper bottom 2 and the false bottom 3, where it is superheated. It then forces itself up through the pipe 5 into the flat pipe 13, and from that point to the drawers. As the opening in the pipe 5 is very small—not larger in size than a straw—it will follow that as the pressure will be great it will be carried to every compartment with sufficient velocity to prevent any condensation or loss of heat.

It will thus be seen that although this device is exceedingly simple of construction it will be found highly durable and efficient in use, enabling a person to do a large amount of cooking with the use of a very small amount of fuel.

Having thus fully described my invention, what I claim as new, and desire to secure by Letters Patent, is—

1. The combination, with a culinary utensil, of a superheating-chamber, a feed-pipe of uniform diameter leading thereto, and an exhaust-pipe leading therefrom, the latter pipe being of decreasing diameter from the bottom to the top and terminating in a jet-orifice, substantially as described.

2. In a cooking utensil, the combination of the casing, a hopper-shaped receptacle fitting therein, having a fixed and a false bottom forming a superheating-chamber, a pipe of uniform diameter for conveying steam from the said receptacle to the superheating-chamber, and a pipe of diminishing diameter for conveying steam from the superheating-chamber, the upper end of the said pipe terminating in a jet-orifice, substantially as and for the purpose specified.

3. In a cooking utensil, the combination of the casing, a hopper-shaped receptacle fitting therein, having a fixed and a false bottom forming a superheating-chamber, an oven on the casing, and a pipe of uniform diameter leading from the hopper-shaped receptacle to the superheating-chamber, and a pipe of diminishing diameter, having its upper end terminating in a jet-orifice, leading from the said chamber and connecting with the oven, substantially as described.

4. In a cooking utensil, the combination of the casing, a hopper-shaped receptacle fitting therein, having a fixed and a false bottom forming a superheating-chamber, an oven on the casing, a pipe of uniform diameter leading from the hopper-shaped receptacle to the superheating-chamber, a pipe of diminishing diameter leading from the said chamber and connecting with the oven, and a filling-pipe extending through the casing and hopper-shaped receptacle, substantially as described.

5. In a cooking utensil, the combination of the casing, a hopper-shaped receptacle fitting therein, having a fixed and a false bottom forming a superheating-chamber, an oven on the casing provided with a series of compartments, a pipe secured within the oven and connecting with said compartments, and a pipe of diminishing diameter, having its upper end terminating in a jet-orifice, leading from the superheating-chamber and connecting with the pipe in the oven, substantially as and for the purpose specified.

6. In a cooking utensil, the combination of the casing, a hopper-shaped receptacle fitting therein, having a fixed and a false bottom, an oven on the casing provided with a series of compartments having openings at their rear ends, a pipe secured within the oven, a series of nozzles secured thereto and engaging the openings in the compartments, and a pipe connecting with the false bottom and with the pipe in the oven, substantially as described.

7. In a cooking utensil, the combination of the casing having a flange on its upper end, a hopper-shaped receptacle fitting therein, a filling-pipe connecting with the receptacle, an oven resting on the flange and provided with a series of compartments, a cover fitting over the said oven, and an escape-pipe in the cover, substantially as described.

In testimony that I claim the foregoing as my own I have hereunto affixed my signature in presence of two witnesses.

WILLIAM JAMES BURNETT.

Witnesses:
JOHN N. MARKHAM,
P. B. LYON.